United States Patent Office 2,734,064
Patented Feb. 7, 1956

2,734,064
METHOD OF TREATING 2,2'-DITHIOBISBENZO-THIAZOLE

Cecil R. Howey, Elmira, Ontario, Canada, assignor to United States Rubber Company, New York, N. Y., a corporation of New Jersey No Drawing. Application April 13, 1953,
Serial No. 348,587

3 Claims. (Cl. 260—306.5)

This invention relates to a method of treating the accelerator of vulcanization of rubber, 2,2'-dithiobisbenzothiazole, and more particularly it relates to the treatment of 2,2'-dithiobisbenzothiazole by mechanically working it in the presence of a definite quantity of moisture, to improve its physical form.

The rubber vulcanization accelerator 2,2'-dithiobisbenzothiazole as ordinarily prepared has the form of an undesirably bulky and dusty material, and its physical form is such that it often cakes on the rolls of the rubber mill during the operation of mixing it with rubber, forming hard agglomerates that are difficult to disperse in the rubber.

A number of expedients for overcoming the foregoing disadvantages have been proposed, but they have not been entirely satisfactory, especially from the standpoint of convenience and economy, and they have been decidedly limited in effectiveness. Such proposals have disadvantages which it is a principal object of the present invention to avoid or mitigate.

I have now found, unexpectedly, that a marketedly superior product can readily be obtained by mechanically working the 2,2'-dithiobisbenzothiazole for a short time in the presence of definite amounts of moisture. Specifically, I have found that 2,2'-dithiobisbenzothiazole powder in a damp condition can be converted into a much less bulky material, that is significantly less dusty and definitely easier to disperse in rubber, by masticating the moist material for a relatively brief time, provided that the moisture content of the 2,2'-dithiobisbenzothiazole during such mastication is within the range of from 15% to 80% by weight. The process is most conveniently and preferably carried out on the filter cake of 2,2'-dithiobisbenzothiazole obtained when the slurry of 2,2'-dithiobisbenzothiazole formed at the conclusion of the reaction by which this material is made is filtered. For most advantageous results, the filter cake preferably has a moisture content of from 45% to 65%. However, the beneficial results of my process may also be obtained by starting with previously dried 2,2'-dithiobisbenzothiazole and adding the requisite amount of water thereto, to provide the critical moisture content necessary for successful operation of the process. If the 2,2'-dithiobisbenzothiazole initially contains more than 80% moisture, it may be dried by any suitable means to bring the moisture content down within the operable range, before carrying out my process.

The mechanical working of the moist 2,2'-dithiobisbenzothiazole may be carried out in any equipment suitable for mixing pastes or powders, such as a ribbon-type of mixer, or a Baker-Perkins dough mixer, or a Werner-Pfleiderer mixer. When the 2,2'-dithiobisbenzothiazole filter cake having the required moisture content is first put in such a mixer it has the consistency of a somewhat moist powder, and it is easily broken up by working between the fingers. After the moist cake has been subjected to agitation or working for some five or ten minutes, a gradual but striking change in its physical appearance takes place. The material becomes much wetter looking, and appears almost muddy or pasty, and at the same time it shrinks remarkably in volume. When this mass is subsequently dried and powdered, it provides a far more dense powder than could be obtained by simply drying and pulverizing the filter cake without subjecting it to the mixing operation described. Also, the treated material gives off far less dust when handled, and it is definitely easier to disperse in rubber.

The foregoing results are in striking contrast to the result obtained by treating a paste or powder containing less than 15% moisture, or more than 80% moisture, since in such cases the improvement is not obtained.

It will be understood that the mechanical working or mixing to which the material is subjected in accordance with the present process is a comparatively mild or gentle working, as opposed to more vigorous actual grinding of the material. In my process the material is simply folded over and over upon itself and agitated, without being subjected to such hard grinding action as would cause fracturing and attrition of the ultimate particles comprising the powder.

The length of time of agitation employed in my process is not critical, and it is simply sufficient to continue the mixing until a definite reduction in volume is noted. It may be stated that in most cases an agitation period of from five to fifteen minutes is generally sufficient to produce substantial improvement. However, somewhat longer mixing times, up to say one or two hours, may give slight additional improvement in bulk. There is usually no proportionate added advantage in continuing the treatment for periods of time longer than this, and for reasons of economy longer mixing periods are not ordinarily employed.

The following examples, in which all parts are expressed by weight, will serve to illustrate the invention in more detail.

Example 1

Eight hundred parts of damp 2,2'-dithiobisbenzothiazole filter cake containing approximately 55% moisture was placed in a Baker-Perkins dough mixer and mixed for thirty minutes. The resultant paste was dried and screened through a 25-mesh screen to break up any lumps. The powder had a bulk of 300 ml. per 100 g. For comparison of quantity of damp filter cake from the same batch was dried without any special treatment, and then screened through a 25-mesh screen. The untreated product had a bulk of 400 ml. per 100 g. and was definitely more dusty than the treated material.

Example 2

Five hundred parts of previously dried and ground 2,2'-dithiobisbenzothiazole (having a bulk of 380 ml. per 100 g.) was placed in a Baker-Perkins dough mixer and 600 grams of water was added, to produce a moisture content of 54.5%. After mixing for thirty minutes, the paste was removed, and then dried and put through a 25-mesh screen. It then had a bulk of only 280 ml. per 100 g.

The tendency of the product produced by the process of the foregoing examples to give off dust is significantly less than in untreated powders, and if further reduction in dusting tendency is desired, substantially complete non-dusting may be achieved by adding very small amounts (suitably ½% to 2%) of material of an oily or waxy consistency, such as mineral oils, vegetable oils, fatty acids or fatty acid salts (e. g., zinc stearate). This is illustrated by the following example.

Example 3

One hundred and forty parts of damp 2,2'-dithiobisbenzothiazole filter cake containing about 50% moisture was loaded into a ribbon mixer and mixed for ten minutes. During this time one part of a commercial mineral oil known as Circo light medium process oil was sprayed onto the 2,2'-dithiobisbenzothiazole. The paste was then removed from the blender and dried in a conventional tray drier, after which it was ground by passing it through a micropulverizer. The resulting powder had an unusually low bulk of 250 ml. per 100 g., and it was entirely free from any tendency to give off dust when handled. When incorporated into rubber on a mill it displayed no tendency to cake or agglomerate in any way and it quickly dispersed uniformly throughout the rubber.

From the foregoing it will be apparent that the invention provides an efficient method of readily reducing the bulk of 2,2'-dithiobisbenzothiazole by an amount of the order of some 25%. The process is easily carried out in conventional equipment, and requires no additional heating step, since it is remarkably effective at room temperature. My new process fits in admirably well with conventional manufacture of 2,2'-dithiobisbenzothiazole. Thus, in making 2,2'-dithiobisbenzothiazole by the conventional process of oxidizing 2-mercaptobenzothiazole in aqueous alkaline solution with chlorine or nitrous acid, there is obtained at the conclusion of the reaction a slurry of 2,2'-dithiobisbenzothiazole which can be filtered off with the aid of a suction filter or centrifuge, to yield a damp filter cake that contains the required critical amount of moisture for carrying out the process of my invention.

The reduction in bulk achieved by the invention makes possible the more economical shipping and handling of the 2,2'-dithiobisbenzothiazole, and makes it possible to meet the commercial specifications on bulk without recourse to the inconvenient and uneconomical extra processing steps of the prior art. At the same time, as indicated previously, the dispersion of the 2,2'-dithiobisbenzothiazole is greatly improved.

As indicated above, the addition of as little as ½% to 2% of an oily substance yields a fine powder that is non-dusting. Such small amount of oily material may be added to the reaction slurry before filtration, or it may be added to the filter cake before or during the agitation step, or it may be added to the treated powder after the agitation step is completed. The fact that small amounts of oily material are effective in conjunction with my process is a decided advantage. The ½–2% of oily material that is sufficient in the present process is insufficient to have any noticeable deleterious effect on the rubber compound in which the accelerator is used. Excessive amounts of oily material represent noticeable contaminant that is objectionable to the user of the product and that tends to cause sticking of the accelerator to the mill rolls in the form of agglomerates that cannot readily be dispersed in the rubber. The present invention avoids this difficulty while at the same time permitting the product to be finely powdered without giving rise to dust that would create a nuisance and health hazard in the rubber factory, as well as represent a loss of an expensive compounding ingredient.

Having thus described my invention, what I claim and desire to protect by Letters Patent is:

1. In a method of manufacturing 2,2'-dithiobisbenzothiazole wherein the said 2,2'-dithiobisbenzothiazole is obtained as a slurry in a liquid reaction medium and is removed therefrom by filtration in the form of a damp filter cake, the improvement which comprises the steps of subjecting the said filter cake of 2,2'-dithiobisbenzothiazole, containing from 15% to 80% moisture, to a mixing action for a period of at least five minutes at room temperature, whereby its bulk is substantially reduced, and subsequently drying the material.

2. A method of treating 2,2'-dithiobisbenzothiazole comprising in combination the steps of adding water to the said 2,2'-dithiobisbenzothiazole to produce a moist powder containing from 15% to 80% moisture, subjecting the said moist powder to a gentle mixing action for a period of from five minutes to two hours, and subsequently drying the powder.

3. In a method of manufacturing 2,2'-dithiobisbenzothiazole, wherein the said 2,2'-dithiobisbenzothiazole is obtained as a slurry in a liquid reaction medium and is removed therefrom by filtration in the form of a damp filter cake, the improvement which comprises the steps of subjecting said filter cake, containing from 45% to 65% of moisture, to a mixing action for a period of from five minutes to two hours, while incorporating from ½% to 2% of oily material in the mix, and subsequently drying the material.

References Cited in the file of this patent

UNITED STATES PATENTS

| | | |
|---|---|---|
| 2,119,131 | Garcia | May 31, 1938 |
| 2,475,582 | Chao | July 12, 1949 |
| 2,598,209 | Bartram | May 27, 1952 |
| 2,598,229 | Creed | May 27, 1952 |